(12) United States Patent
Campbell et al.

(10) Patent No.: US 10,315,850 B2
(45) Date of Patent: Jun. 11, 2019

(54) PROPPANT CONVEYOR SYSTEMS AND METHODS OF USE

(71) Applicant: 1875452 Alberta Ltd., Grande Prairie (CA)

(72) Inventors: David Campbell, Grande Prairie (CA); Shane Campbell, Grande Prairie (CA); Brent Arcand, Grande Prairie (CA)

(73) Assignee: 1875452 Alberta Ltd., Grande Prairie (CA)

( * ) Notice: Subject to any disclaimer, the term of this patent is extended or adjusted under 35 U.S.C. 154(b) by 0 days.

(21) Appl. No.: 15/649,082

(22) Filed: Jul. 13, 2017

(65) Prior Publication Data

US 2019/0016536 A1     Jan. 17, 2019

(51) Int. Cl.
*B65G 21/12* (2006.01)
*B65G 21/14* (2006.01)
(Continued)

(52) U.S. Cl.
CPC ............ *B65G 21/12* (2013.01); *B65G 17/126* (2013.01); *B65G 21/14* (2013.01); *B65G 37/00* (2013.01);
(Continued)

(58) Field of Classification Search
CPC .............................. B65G 17/126; B65G 41/006
(Continued)

(56) References Cited

U.S. PATENT DOCUMENTS 3,802,584 A * 4/1974 Sackett, Sr. ............ B65G 19/16
                                                              198/535
4,187,047 A   2/1980 Squifflet
(Continued)

FOREIGN PATENT DOCUMENTS

CA     2600216     3/2009
CA     2712692     2/2012
(Continued)

OTHER PUBLICATIONS

Loop Belt Industries, LB33T4-20 Loop Belt Telescopic Conveyor, Brochure, available at least as early as Apr. 21, 2016, 2 pages, URL=http://www.loopbeltind.com/docs/LB33T4-20-Oversize-Brochure.pdf.
Loop Belt Industries, LB40T5-20 Loop Belt Telescopic Conveyor, Brochure, available at least as early as Apr. 21, 2016, 3 pages, URL=http://www.loopbeltind.com/docs/LB40T5-20Brochure020514-SCRN.pdf.
(Continued)

*Primary Examiner* — Douglas A Hess
(74) *Attorney, Agent, or Firm* — Robert A. Nissen

(57) ABSTRACT

A proppant conveyor system has: a tower; a bucket elevator; a telescopic conveyor boom mounted to the tower above a ground surface; the telescopic conveyor boom being connected to convey proppant from an outlet of the bucket elevator to a discharge point defined by the telescopic conveyor boom; and the telescopic conveyor boom being mounted to swing in lateral directions relative to an axis of the tower to reposition the discharge point. A method includes: conveying proppant up a bucket elevator, along a telescopic conveyor boom mounted on a tower above a ground surface, and into an inlet of a first storage bin at a well site; repositioning the telescoping conveyor boom over an inlet of a second storage bin at the well site by swinging the telescopic conveyor boom in a lateral direction relative to an axis of the tower; and conveying proppant up the bucket elevator, along the telescopic conveyor boom, and into an inlet of the second storage bin.

28 Claims, 4 Drawing Sheets

(51) Int. Cl.
| | |
|---|---|
| *B65G 37/00* | (2006.01) |
| *B65G 47/06* | (2006.01) |
| *B65G 17/12* | (2006.01) |
| *B65G 47/44* | (2006.01) |
| *B65G 41/00* | (2006.01) |
| *B65G 47/16* | (2006.01) |
| *E21B 41/00* | (2006.01) |
| *E21B 43/267* | (2006.01) |

(52) U.S. Cl.
CPC .......... *B65G 41/006* (2013.01); *B65G 47/16* (2013.01); *B65G 47/44* (2013.01); *E21B 41/00* (2013.01); *E21B 43/267* (2013.01); *B65G 2201/045* (2013.01); *B65G 2207/14* (2013.01); *B65G 2812/013* (2013.01)

(58) Field of Classification Search
USPC .......... 198/550.11, 566, 567, 568, 586, 587, 198/588, 594
See application file for complete search history.

(56) References Cited

U.S. PATENT DOCUMENTS

| | | | |
|---|---|---|---|
| 4,561,821 A | 12/1985 | Dillman | |
| 4,568,232 A * | 2/1986 | Ray | B65G 67/606 198/568 |
| 4,631,125 A * | 12/1986 | Parks | B01F 13/10 198/560 |
| 5,465,829 A * | 11/1995 | Kruse | A01C 15/003 198/538 |
| 6,283,269 B1 | 9/2001 | Mayer | |
| 6,340,278 B1 * | 1/2002 | Takeda | E04G 21/0409 414/140.9 |
| 6,390,006 B1 * | 5/2002 | Sridhar | B63B 25/02 114/73 |
| 8,506,232 B2 * | 8/2013 | Gallione | B60P 1/36 198/314 |
| 8,881,749 B1 | 11/2014 | Smith | |
| 8,939,697 B2 | 1/2015 | Herman et al. | |
| 9,142,134 B2 | 9/2015 | White | |
| 9,315,294 B2 | 4/2016 | Herman et al. | |
| 9,371,187 B2 * | 6/2016 | Priepke | A01D 41/1217 |
| 9,428,094 B2 | 8/2016 | Herman et al. | |
| 9,499,348 B2 * | 11/2016 | Teichrob | B65G 37/00 |
| 9,657,219 B2 * | 5/2017 | Rodriguez | C09K 8/805 |
| 9,752,389 B2 | 9/2017 | Pham et al. | |
| 9,783,093 B1 * | 10/2017 | Esch | B60P 1/36 |
| 9,856,662 B2 | 1/2018 | Vierkotten et al. | |
| 9,878,651 B2 | 1/2018 | Herman et al. | |
| 10,046,955 B2 | 8/2018 | Vierkotten et al. | |
| 10,059,535 B2 | 8/2018 | Herman et al. | |
| 10,065,814 B2 | 9/2018 | Herman et al. | |
| 2002/0134550 A1 * | 9/2002 | Leeson et al. | |
| 2013/0142601 A1 | 6/2013 | McIver et al. | |
| 2014/0044508 A1 | 2/2014 | Luharuka et al. | |
| 2014/0377042 A1 | 12/2014 | McMahon | |
| 2015/0191304 A1 | 7/2015 | Herman et al. | |
| 2015/0368036 A1 | 12/2015 | Bromley et al. | |
| 2016/0036441 A1 | 2/2016 | Dey et al. | |
| 2016/0185322 A1 | 6/2016 | Vierkotten et al. | |
| 2016/0221761 A1 | 8/2016 | Walder et al. | |
| 2016/0223313 A1 | 8/2016 | Vierkotten | |
| 2016/0264354 A1 | 9/2016 | Herman et al. | |
| 2016/0280467 A1 | 9/2016 | Herman et al. | |
| 2016/0348655 A1 | 12/2016 | Merten et al. | |
| 2017/0050825 A1 | 2/2017 | Oleksyuk et al. | |
| 2017/0080600 A1 | 3/2017 | Dickerman et al. | |
| 2017/0081154 A1 | 3/2017 | Vierkotten et al. | |
| 2017/0130808 A1 | 5/2017 | Pham | |
| 2017/0254101 A1 | 9/2017 | Segschneider et al. | |
| 2018/0023575 A1 | 1/2018 | Roisum | |
| 2018/0037444 A1 | 2/2018 | Henikl et al. | |
| 2018/0045186 A1 | 2/2018 | Koch et al. | |
| 2018/0162701 A1 | 6/2018 | Henikl et al. | |
| 2018/0170322 A1 | 6/2018 | Gallione | |
| 2018/0194259 A1 | 7/2018 | Herman et al. | |
| 2018/0319609 A1 | 11/2018 | Herman et al. | |

FOREIGN PATENT DOCUMENTS

| | | |
|---|---|---|
| CA | 2745682 | 1/2013 |
| CA | 2747116 | 1/2013 |
| CA | 2923660 | 1/2013 |
| CA | 2795055 | 5/2014 |
| CA | 2820204 | 12/2014 |
| CA | 2913675 | 12/2014 |
| CA | 2913714 | 12/2014 |
| CA | 2830145 | 4/2015 |
| CA | 2927471 | 4/2015 |
| CA | 2832169 | 5/2015 |
| CA | 2838445 | 7/2015 |
| CA | 2885668 | 9/2016 |
| CA | 2933170 | 8/2017 |

OTHER PUBLICATIONS

Loop Belt Industries, "Post Mounted LB0T5", Drawing, available at least as early as Apr. 21, 2016, 3 pages, URL=http://www.loopbeltind.com/docs/LB40T5-POST-MOUNTED.pdf.

Putzmeister, Telebelt MXTB 130 & MXTB 600 Placing Conveyror, Brochure, available at least as early as Mar. 24, 2017, 2 pages, URL=http://www.putzmeisteramerica.com/es/data/products/documents/MXTB130MXTB600_TB_4392_US.pdf.

Loop Belt Industries, LB40T5-20 Loop Belt Telescopic Conveyor, Brochure, available at least as early as Apr. 21, 2016, 2 pages, URL=http://www.loopbeltind.com/docs/TTLB40T5-20-Brochure.pdf.

Loop Belt Industries, Telescopic Conveyor Design Patterns, available at least as early as Mar. 24, 2017, 5 pages.

Source Energy Services, Safe and efficient well site storage and handling, available Jan. 16, 2016, 2 pages, URL=https://web.archive.org/web/20160116033554/http://sourceenergyservices.com/field-solutions/.

Vimeo, Sahara Field Solutions, video screenshot, 2 pages, available at least as early as 2016, URL=https://vimeo.com/131561953.

* cited by examiner

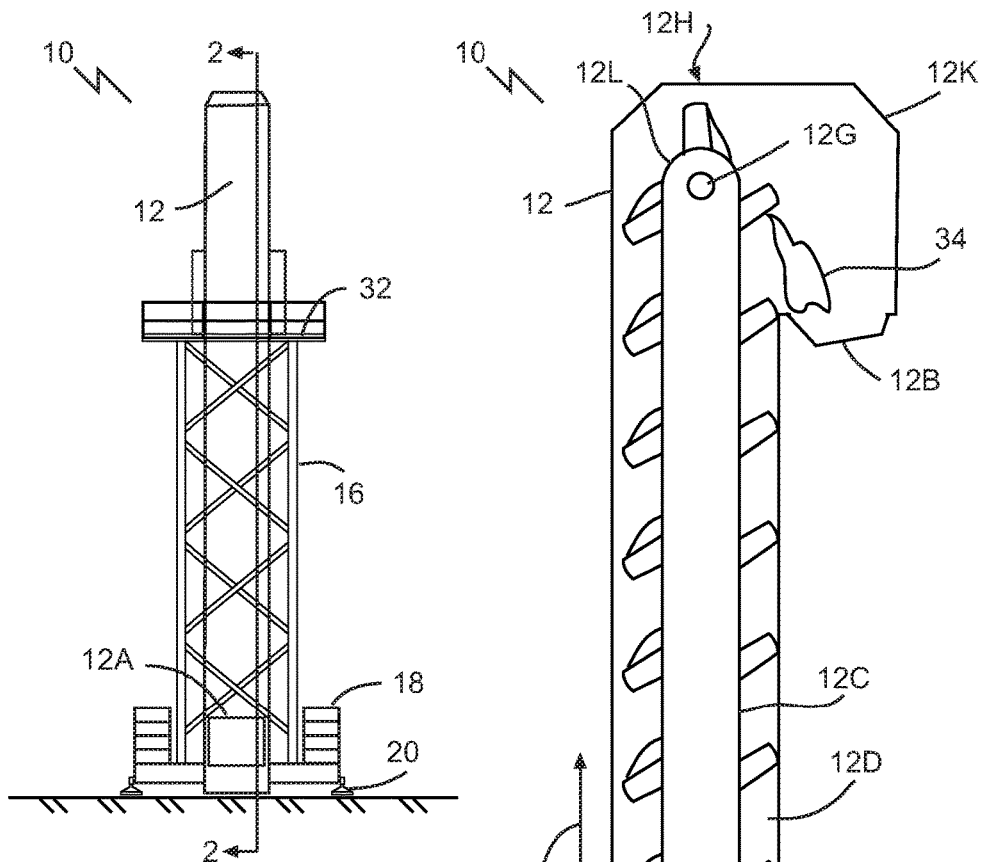
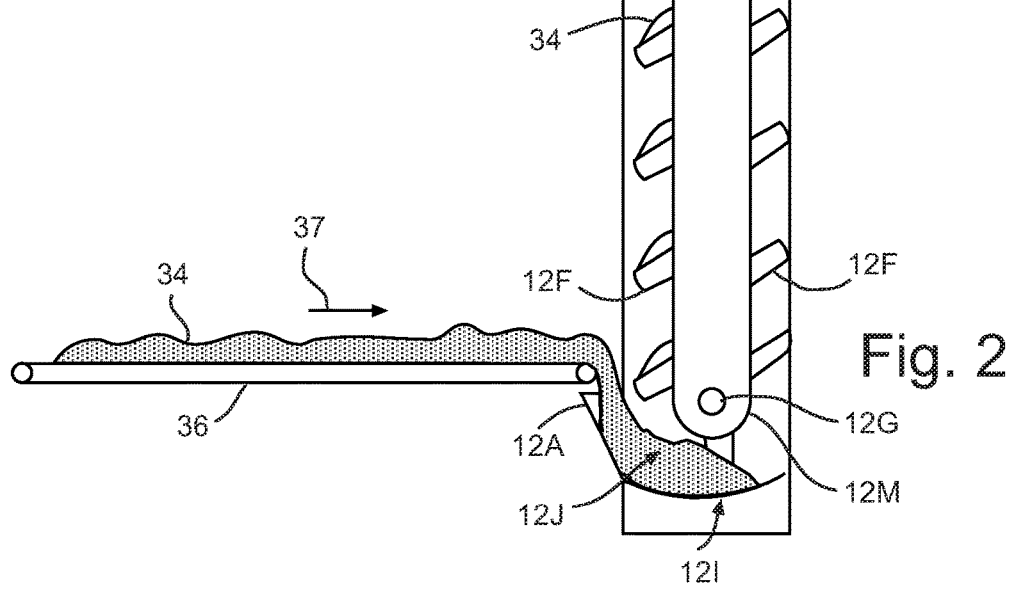

PROPPANT CONVEYOR SYSTEMS AND METHODS OF USE

TECHNICAL FIELD

This document relates to proppant conveyor systems and methods of use.

BACKGROUND

Well site proppant storage systems exist that include a skid that mounts, in close proximity, a plurality of storage bins and a bucket elevator. A pair of top conveyors coordinate along a fixed axis to selectively dispense proppant from the bucket elevator into the bins. Other well site storage systems use an inclined conveyor to feed a telescopic placing conveyor, such as a PUTZMEISTER™ TELE-BELT™ MXTB 130™ system, which feeds proppant to a plurality of storage bins.

SUMMARY

A proppant conveyor system is disclosed, comprising: a tower; a bucket elevator; a telescopic conveyor boom mounted to the tower above a ground surface; the telescopic conveyor boom being connected to convey proppant from an outlet of the bucket elevator to a discharge point defined by the telescopic conveyor boom; and the telescopic conveyor boom being mounted to swing in lateral directions relative to an axis of the tower to reposition the discharge point.

A method is disclosed comprising: conveying proppant up a bucket elevator, along a telescopic conveyor boom mounted on a tower above a ground surface, and into an inlet of a first storage bin at a well site; repositioning the telescoping conveyor boom over an inlet of a second storage bin at the well site by swinging the telescopic conveyor boom in a lateral direction relative to an axis of the tower; and conveying proppant up the bucket elevator, along the telescopic conveyor boom, and into an inlet of the second storage bin.

In various embodiments, there may be included any one or more of the following features: A group of storage bins spaced a remote lateral distance from the tower within a maximum range of the telescopic conveyor boom. The group of storage bins are located on a well site as part of equipment for carrying out a fracturing operation. The tower is located closer to an entrance to the well site than is the group of storage bins. The tower is located outside of the well site. Each storage bin of the group of storage bins is configured as a trailer that has a horizontal transport position and a vertical deployed position. The tower comprises a ballast weight system at a base of the tower. The tower comprises plural ground-engaging feet. The discharge point is defined at a free end of the telescopic conveyor boom. A discharge chute depends from the telescopic conveyor boom to define the discharge point. The telescopic conveyor boom is mounted to swing about a lateral axis relative to the tower to raise and lower the free end. The bucket elevator is integrally formed within the tower. The bucket elevator is mounted adjacent a side of the tower. A feed conveyor mounted to convey proppant to an inlet of the bucket elevator. The telescopic conveyor boom comprises plural sections, which are mounted to telescope relative to one another other, with each of the plural sections mounting a respective cooperating conveyor belt. The telescopic conveyor boom has an axial length of one hundred feet or more. The system is configured to convey eight tonnes or more of proppant a minute. The system is located at a multi-well pad. The telescopic conveyor boom extends from outside to inside the well site. Repositioning comprises swinging the telescopic conveyor boom about a lateral axis relative to the tower to raise and lower a free end of the telescopic conveyor boom. Repositioning comprises extending or retracting plural sections of the telescopic conveyor boom, with each of the plural sections mounting a respective cooperating conveyor belt. Conveying further comprises conveying proppant along a feed conveyor to an inlet of the bucket elevator. Prior to conveying proppant into the inlet of the first storage bin, positioning the telescopic conveyor boom over the inlet of the first storage bin. An initial stage of assembling the tower at the well site. The telescopic conveyor boom forms a cantilever. The bucket elevator and telescopic conveyor boom are mounted on a tower. The telescopic conveyor boom is mounted to swing in horizontal directions.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1A is a rear view of the proppant conveyor system of FIG. 1.

FIG. 2 is a section view taken along the 2-2 section lines from FIG. 1A illustrating the interior components of the bucket elevator of the proppant conveyor system of FIG. 1.

DETAILED DESCRIPTION

Figure 1:
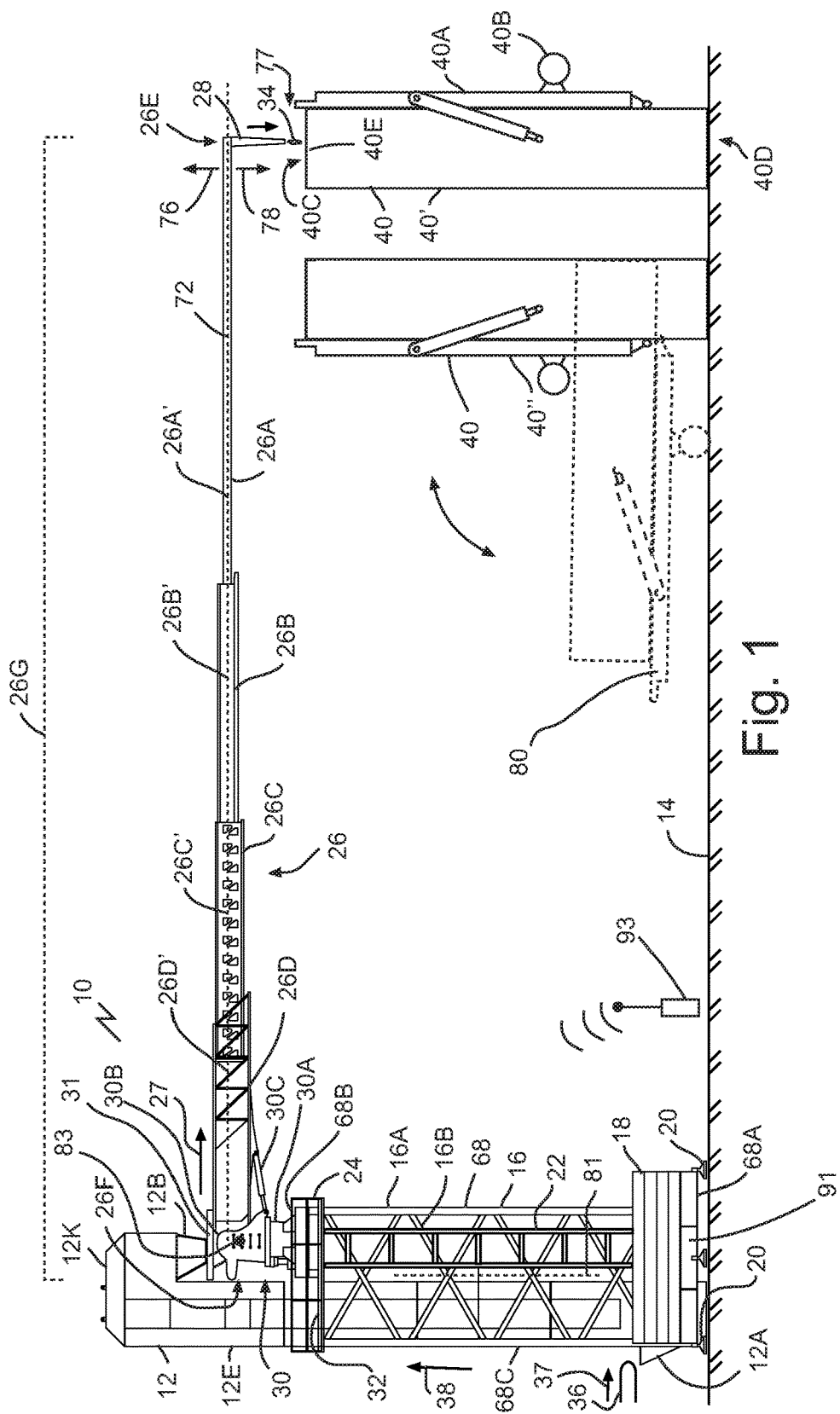
FIG. 1 is a side elevation view of a proppant conveyor system aligned to convey proppant into an inlet of one of a plurality of proppant storage bins. Dashed lines are used to show one of the bins in a horizontal, transport position.

Immaterial modifications may be made to the embodiments described here without departing from what is covered by the claims.

Formations of wells, for example new wells or low producing wells that have been taken out of production, may be fractured to attempt to achieve higher production rates. In a fracturing operation, a proppant and a gelled fracturing fluid, for example from a frac fluid source may be mixed in a blender and then pumped into a well that penetrates an oil or gas bearing formation. High pressure may then be applied to the well such that the formation fractures and proppant carried by the fracturing fluid flows into the fractures. The proppant in the fractures holds the fractures open after pressure is relaxed and production may be resumed.

A hydraulic fracturing proppant may be a solid bulk material, for example sand, treated sand, man-made ceramic materials, glass, sintered bauxite, or combinations of these. Proppant is typically selected or made to be resistant to fracturing under high pressure and helps to keep an induced hydraulic fracture open during or following a fracturing treatment. The type of proppant added to a fracturing fluid may vary in composition depending on the type of fracturing used.

Proppants are selected to be permeable to gas and oil under high pressures. Thus, once in place within formation the interstitial spaces between particles increases the porosity of the formation to increase production. Thus, a proppant must be selected to have sufficient mechanical strength to withstand closure stresses to hold fractures open after the fracturing pressure is withdrawn. Larger proppants have greater permeability than small mesh proppants at low closure stresses. However, larger proppants have a relatively higher tendency to be crushed, producing fine, low porosity, particulates at high closure stresses.

In a typical hydraulic fracturing methodology, proppant materials are harvested or created at one location and shipped to a well site to carry out fracturing operations. Proppant is typically fine, abrasive, dense, heavy, bulk material. Proppant transport requires complex logistically planning and infrastructure to store, ship, and dispense the proppant material. Conventional strategies involve the use of large, rugged containers that hold substantial quantities of proppant materials. Because proppants such as sand are quite dense, the containers must be rugged and robust enough to support tons of material.

Before and during a well fracturing operation it is necessary to store large amounts of bulk material on site. One approach to storing proppant at a well site is to place storage trailers horizontally on the ground and load and unload the proppant using pneumatics. Such an approach may require a relatively large footprint on the site, increasing site lease costs and environmental impact. Such an approach may also lead to inefficient use of trucking equipment, increased complexity of operations at the well site, and potentially lower downhole production due to proppant damage.

Reducing the number of storage trailers on site may reduce footprint while creating supply and other issues. For example, low proppant capacity at a well site may create logistical issues and increase incremental costs associated with truck and rail demurrage. The loading and unloading of the proppant may be inefficient. Pneumatic filling may damage and modify the particles of proppant from a generally spherical shape to irregular and/or broken shapes. Such shape changes may result in less negative space or less space between the sand particles, which can in turn lead to lower well conductivity or lower rates of extraction of the oil or other material being drilled for. Pneumatic pumping may also create unhealthy dust.

An alternative approach to horizontal storage is to store the proppant vertically in free-standing silo units that can be trucked to the well site and then stood on end. The silo units are filled with proppant from the top and the proppant can then be gravity-drained or discharged from each silo unit through a chute extending from the side of the silo unit. Use of such free-standing silo units addresses some of the issues associated with the use of horizontal storage trailers.

Referring to FIG. 1, a proppant conveyor system 10 is illustrated comprising a tower 68, a bucket elevator 12 and a telescopic conveyor boom 26. Referring to FIG. 1, the bucket elevator 12 may have an inlet, for example an inlet hopper 12A and an outlet, for example an outlet hood or an outlet chute 12B. The telescopic conveyor boom 26 may be mounted to the tower 68 above a ground surface 14. The boom 26 may be connected to convey proppant 34 from the outlet chute 12B of the bucket elevator 12, for example to a hopper 31 or other suitable inlet to the boom 26, and to a discharge point 77 defined by the telescopic conveyor boom 26.

Referring to FIG. 1, the tower 68 may have a variety of suitable characteristics. As shown, the bucket elevator 12 may be integrally formed as part of the tower 68. The tower 68, which may be freestanding as shown, may comprise plural ground-engaging feet 20, for example four or more feet 20, which may include extendable outriggers. The tower 68 may be founded by one or other suitable mechanisms such as foundation anchors, base plates, concrete blocks or other suitable weights. The tower 68 may comprise a ballast system, for example made up of a plurality of concrete blocks or weights 18, at a base 68A of the tower 68. Referring to FIG. 1A, the inlet hopper 12A may be located within a gap between opposing stacks of weights 18.

Referring to FIG. 1, the tower 68 may be formed by a structural mast, such as a lattice frame 16. Lattice frame 16 may comprise a plurality of columns 16A and a plurality of interconnected cross members 16B. Lattice frame 16 may support a platform 32, which may mount a hand railing 24, for example to permit safe use, maintenance, and repair of the proppant conveyor system 10 from the platform 32. A ladder 22 may be mounted to the tower 68, for example to facilitate worker access to the proppant conveyor system 10. The lattice frame 16 may be height adjustable by addition or subtraction of vertical sections, for example ten foot tall sections, to any desired height. Each section may have its own associated working platform 32.

Referring to FIGS. 1, 1A, and 2, the bucket elevator 12 may have a structure suitable for transferring proppant 34 from inlet hopper 12A to the relatively elevated position of the outlet chute 12B. The proppant conveyor system 10 may be configured to convey eight tonnes or more of proppant 34 a minute, for example ten tonnes or more per minute. Referring to FIG. 2, the bucket elevator 12 may comprise a vertical elevator belt, rope, or chain assembly 12C positioned within an interior 12D of a housing 12E of the bucket elevator 12. A series of scooping devices such as buckets 12F may be connected to the vertical elevator chain assembly 12C. A pair of chain mounting axles 12G may be spaced from one another to define a base end 12L and top end 12M of chain assembly 12C, at a base 12I and a top 12H, respectively, of housing 12E. The vertical elevator chain assembly 12C may be mounted under sufficient tension, for example using a tensioning device (not shown), on the pair of axles 12G such that when the pair of axles 12G rotate in the same direction, the chain assembly 12C rotates to lift and lower the buckets 12F on the assembly 12C. Housing 12E of the bucket elevator 12 may have a base 12J that is structured, for example curved, to follow the path of each bucket 12F to maximize the ability of each bucket 12F to scoop up proppant 34 deposited in interior 12D via the inlet hopper 12A. Outlet chute 12B may be connected to or otherwise depend from a head 12K of the housing 12E. The chute 12B may be oriented and positioned to receive proppant 34 that is dumped from buckets 12F as such buckets 12F crest the top end 12M of the chain assembly 12C. The bucket elevator 12 may be centered coaxial with axis 81 of tower 68 in some cases.

Figure 3:
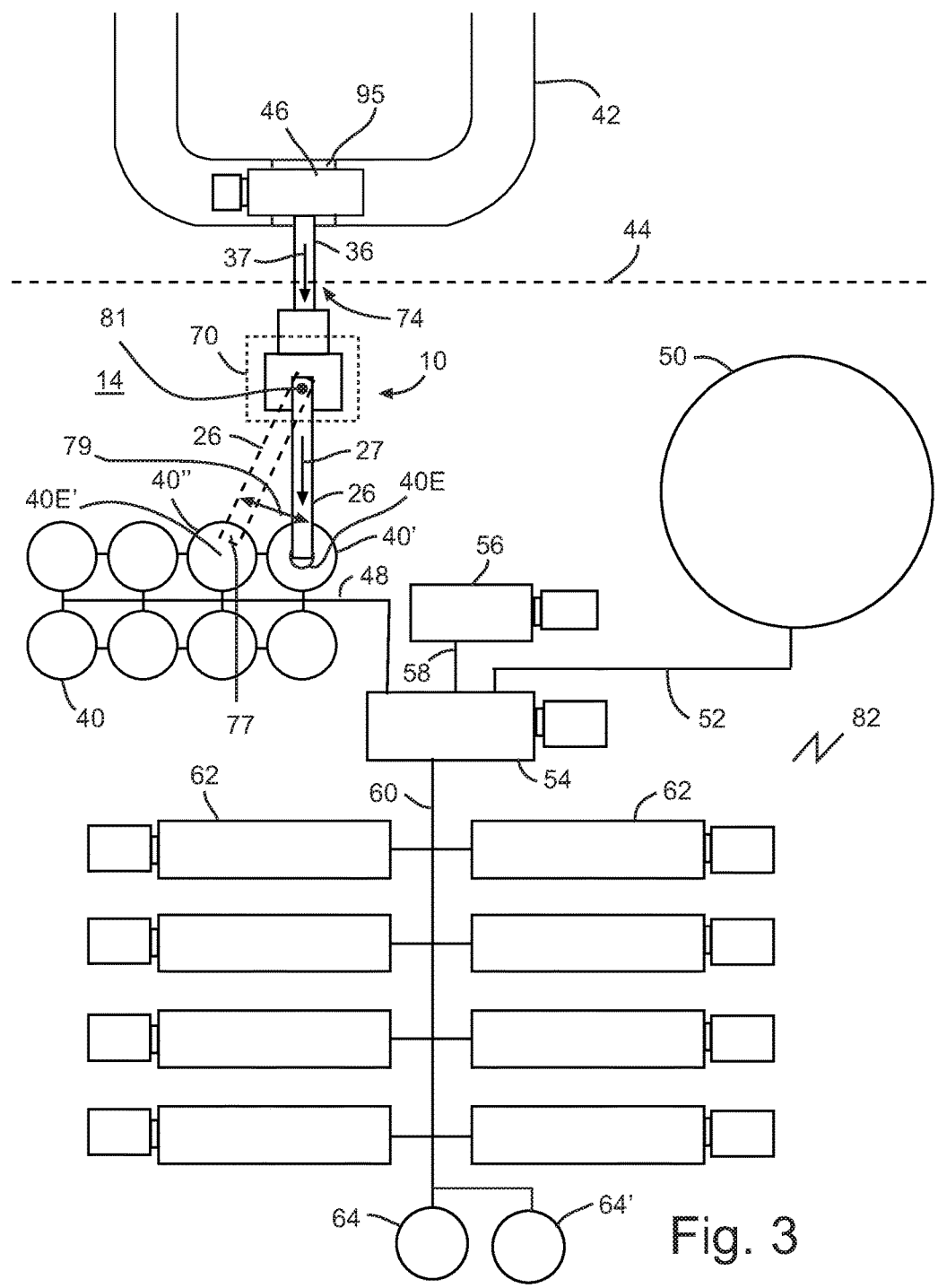
FIG. 3 is a schematic of a proppant conveyor system and plurality of proppant storage deployed at a well site, with a road leading up to the well site for delivery of proppant via proppant transport trucks.

Referring to FIG. 1, the telescopic conveyor boom 26 may have a structure suitable for conveying proppant 34 from the outlet of the elevator 12 to a desired discharge point 77. Referring to FIGS. 1 and 3, the telescopic conveyor boom 26 may form a cantilever, with a free end 26E. Referring to FIG. 1, the telescopic conveyor boom 26 may convey the proppant 34 to a discharge point 77 along the telescopic conveyor boom 26, for example in a single direction 27. The discharge point may be defined at a free end 26E of the telescopic conveyor boom 26. The free end 26E may discharge proppant 34 through a discharge chute 28 that depends from the boom 26 to define the discharge point 77. Discharge chute 28 may depend from the telescopic conveyor boom 26. Chute 28 may be provided with an adjustable length, and may reach down to and in some cases contact or connect to the inlet 40E of the bin 40 being filled.

Figure 4:
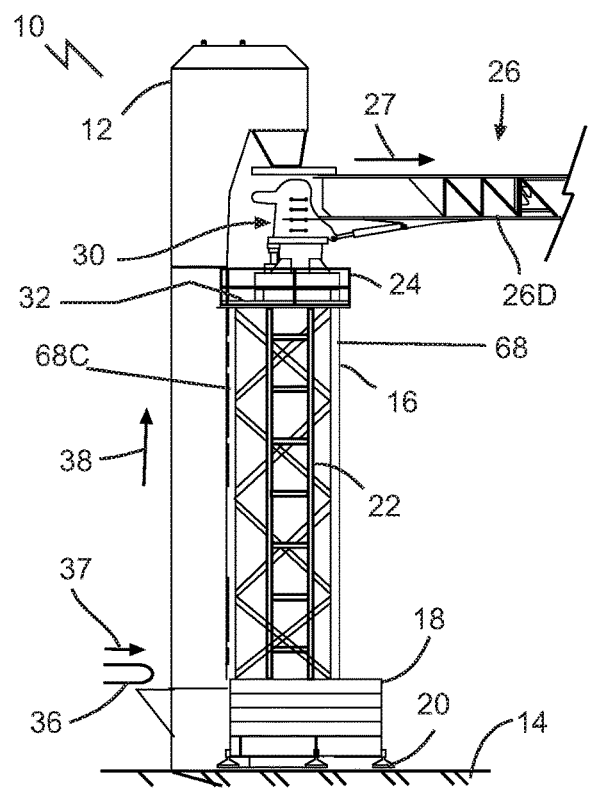
FIG. 4 is a side elevation view of a proppant conveyor system with a bucket elevator connected to a side of a conveyor boom tower.

Referring to FIGS. 1, 3, and 4, the telescopic conveyor boom 26 may have a structure suitable for conveying the proppant 34 to a remote location or bin 40. The telescopic conveyor boom 26 may have an axial length 26G of one hundred feet or more, for example one hundred and twenty feet, to convey proppant 34 to storage bins 40 a distance away from tower 68. Referring to FIG. 1, the telescopic conveyor boom 26 may be formed by plural sections, for example plural sections 26A-26D, which are mounted to telescope relative to one another other to extend or retract the boom 26. Each of the plural sections 26A-26D, such as base section 26A, intermediate sections 26B and 26C, and tip section 26D, may mount a respective conveyor belt, for example conveyor belts 26A', 26B', 26C', and 26D'. The location of each belt is roughly indicated by the line that delineates an axis 72 of the boom 26. Each section may be covered, to minimize or shield the exposure of proppant 34 to wind, water, and other elements as such proppant is being conveyed on the belts. Each subsequent belt may be located underneath a preceding belt with overlap at the transition between belts, to ensure that proppant moves smoothly from one belt to another.

Referring to FIG. 3, the proppant conveyor system 10 may have a structure suitable for rotating the telescopic conveyor boom 26. For example, the telescopic conveyor boom 26 may be mounted to swing in lateral directions 79, for example in a lateral plane 70, as shown relative to an axis 81 of the tower 68 to reposition the discharge point 77. The telescopic conveyor boom 26 may be mounted to rotate about the lateral plane 70 relative to the bucket elevator 12. The lateral plane may be a horizontal plane 70 in use. Referring to FIG. 1, lateral swinging or rotation of the boom 26 may be achieved via a suitable mechanism. For example, a base end 26F of the telescopic conveyor boom 26 may be mounted to rotate about a boom position control unit such as turret 30. Turret 30 may comprise a spool 30A, which mounts the boom 26 via a rotating axle 30B connected to the spool 30A. A suitable power source such as a hydraulic power unit 91 (FIG. 1) may be used, such as a diesel-engine driven hydraulic power source mounted on a truck (not shown), to swing the boom 26 about the turret 30, to point the discharge point 77 in different angular locations about the tower 68. The power source may power all components and functions of the system 10, or separate power sources may be provided for one or more functions. The boom 26 may have a suitable angular range, such as three hundred and sixty degrees in some cases, and one hundred and eighty degrees or less in other cases, although other ranges greater or smaller than the preceding examples may be used.

Referring to FIG. 1, the telescopic conveyor boom 26 may be mounted to swing about a lateral axis 83 relative to the tower 68 to raise and lower the free end 26E. The lateral axis 83 may be a horizontal axis in some cases, and in some cases may be perpendicular to a tower axis 81. A height control actuator, such as hydraulic cylinder 30C, may be connected between the axle 30B and the boom 26. The action of cylinder 30C may raise and lower the free end 26E of the telescopic conveyor boom 26, for example in directions 76 and 78 respectively, relative to the bucket elevator 12. In some cases forty five degrees or more of height control may be achieved. Conveying action of the boom 26 may be carried out while the boom 26 is level, inclined, or declined.

Referring to FIG. 1, the proppant conveyor system 10 may comprise a group of storage bins 40, for example storage bins 40' and 40". Bins 40 may be spaced remotely relatively to, for example fifty feet or more or less away from, the tower 68 but within a maximum range of the telescopic conveyor boom 26.

Referring to FIGS. 1 and 3, each storage bin of the group of storage bins 40 may have a structure suitable for transporting the storage bin and receiving the proppant 34. Each storage bin of the group of storage bins 40 may be configured as a respective trailer 80 that has a horizontal transport position (dashed lines) and a vertical deployed position (solid lines). Each trailer 80 may have a respective bin actuator or actuators 40A, for example for lifting the trailers 80 to the vertical deployed position as illustrated in FIG. 1 or for lowering the trailers 80 to a horizontal transport position. Each of the trailers 80 may have a plurality of wheels 40B, for example to permit each trailer 80 to be towed via a tractor truck when in the horizontal transport position. The group of storage bins 40 may have respective top ends 40C, for example structured to receive the proppant 34 when the group of storage bins 40 are in the vertical deployed position. Each top end 40C defines an inlet 40E of the respective bin 40. Each bin 40 may have a respective base end 40D, for example that rests on the ground surface 14 when the bin 40 is in the vertical deployed position.

Referring to FIG. 3, the proppant conveyor system 10 and bins 40 may be positioned at suitable locations relative to a well site 82. The group of storage bins 40 may be located on the well site 82 as part of equipment for carrying out a fracturing operation. The tower 68 may be located closer to an entrance 74 to the well site 82 than is the group of storage bins 40. In such a case, the impact on the site 82 caused by the movement of proppant transport trucks 46 is reduced. As shown, the telescopic conveyor boom 26 may extend from outside to inside the well site 82. The tower 68 may be located one the well site 82, although in the example shown the tower 68 is located outside of the well site 82, for example outside a perimeter 44 of the well site 82. The well site 82 may be surrounded by a berm, for example that defines the perimeter 44.

Figure 5:
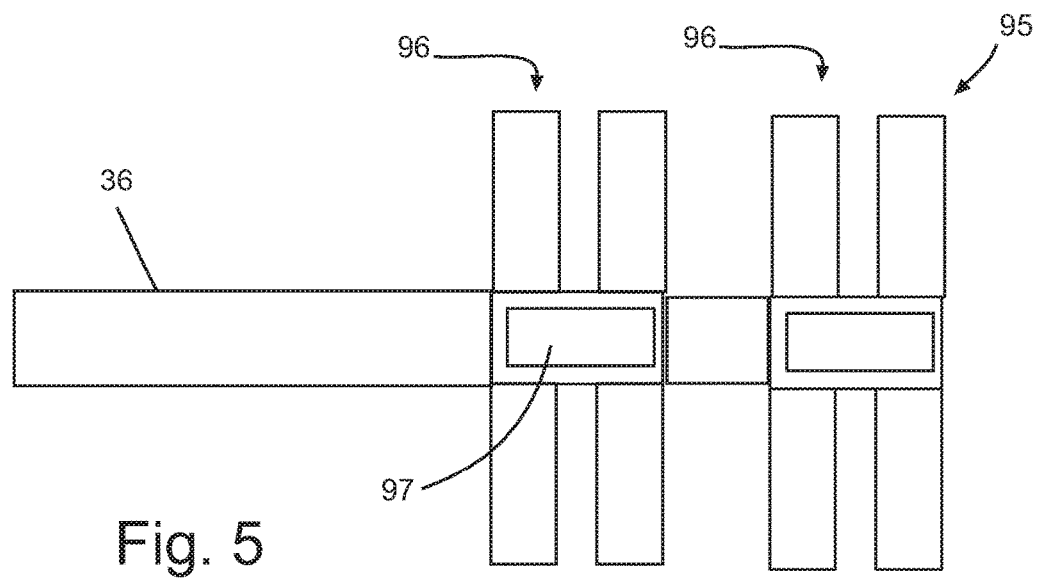
FIG. 5 is a top plan view of a drive over inlet and covered feed conveyor for unloading proppant from a supply vehicle.

Referring to FIG. 3, a suitable method of conveying proppant to bins 40 may be used. In an initial stage, a vehicle such as a proppant-loaded truck 46 may unload proppant for supply to system 10, for example by delivery to a feed conveyor 36 mounted to convey the proppant 34 to the inlet hopper 12A of the bucket elevator 12 (inlet hopper 12A shown in FIG. 1). Referring to FIGS. 3 and 5, truck 46 may unload by a suitable mechanism such as a drive over ramp proppant receiver 95 connected to conveyor 36. Referring to FIG. 5, the drive over receiver 95 may comprise one two or more sets of ramps 96 to receive proppant from a corresponding number of trucks 46 at the same time. The feed conveyor 36 may be covered to reduce proppant loss or exposure to the elements. Referring to FIG. 3, the truck 46 may arrive on a road 42 adjacent the well site 82, and may transfer the proppant 34 to the proppant conveyor system 10 via the feed conveyor 36. In cases where the tower 68 is located on the well site the truck 46 may enter the well site 82. In other cases the tower 68 may be located in a staging area adjacent the entrance 74 to the well site 82. The well site 82 is often a well-identified area delineated by fencing, berms, or other means to distinguish the area, which is often the subject of a lease, relative to the surrounding lands.

Referring to FIGS. 1 and 3, prior to or during a fracturing operation, proppant may be loaded into the bins 40 located on the well site 82. In an initial stage the system 10 may be assembled at or adjacent the well site 82. The system 10, for example the tower 68, conveyor boom 26, and elevator 12 may be transported on a trailer (not shown), and erected in place, either as a standalone unit or as a unit that when deployed and collapsed is integrally connected to a dedicated transport trailer (not shown). Prior to conveying proppant into the first storage bin 40, the telescopic conveyor boom 26 may be positioned over the inlet 40E of a first storage bin 40. A feed conveyor 36 may convey proppant into the bucket elevator 12. The proppant conveyor system 10 may convey proppant up bucket elevator 12, along the telescopic conveyor boom 26, and into an inlet 40E of a first storage bin 40'. A controller, such as one that operates with a remote control 93 or wired control console, may be used to operate the system.

Once the bin 40' is full, the system 10 may be adjusted to fill the other bins 40 as desired. The telescoping conveyor boom 26 may be repositioned over an inlet 40E' of a second storage bin 40", for example by swinging the telescopic conveyor boom in a lateral direction 79. Referring to FIG. 1, repositioning may comprise swinging the telescopic conveyor boom 26 about a lateral axis 83 relative to the tower 68 to raise and lower the free end 26E of boom 26 to accommodate different heights of bins 40. In some cases the free end 26E may be raised and lowered as part of a protocol for repositioning, for example the free end 26E may be raised, laterally swung over the second bin 40", and then lowered. Repositioning may comprise extending or retracting plural sections 26A-D of the telescopic conveyor boom 26, for example to permit discharge point 77 to access plural bins 40 at different absolute distances from the tower 68 as shown. Once proppant delivery to bins 40 is complete, the system 10 may be disassembled and transported off-site, or the system 10 may simply remain in place during the operation until further proppant delivery to bins 40 is required or the operation is completed.

Referring to FIG. 3, once proppant is loaded in bins 40, the fracturing operation may commence. Fracturing fluid, for example from the frac fluid pond 50 may be transferred to a blender 54 via a fracturing fluid line 52. In an initial phase of the operation, fracturing fluid may bypass the blender 54 and pass directly into the well head 64 via high pressure pumpers 62. Once the initial pad of fracturing fluid is supplied to well head 64, proppant may be introduced into the well. Proppant 34 may thus be transferred from the one or more storage bins 40 to the blender 54 via a proppant line 48. Gelling agent may be supplied via a gel line 58 to the fracturing fluid, for example via a blender 54. Other chemicals may be supplied into the fracturing fluid as desired. The blender 54 may facilitate mixing of the proppant 34, gel, and the frac fluid, to produce a gelled, proppant-laden fracturing fluid. The gelled frac fluid with suspended frac fluid may then be pumped into well head 64 via line 60. The pressure on the fracturing fluid in the well may be increased to above fracturing pressures to cause fractures to form in the formation downhole adjacent the well. The gelled fracturing fluid with entrained and suspended proppant is pumped into the fractures, and the pressure is reduced. Upon reduction of the pressure, the fractures relax, and proppant within the fractures acts to support the fractures from fully closing, thus increasing the porosity of the formation.

Referring to FIG. 3, the system 10 may be deployed at a multi-well site 82. The well site 82 may be a multi-well pad, for example having plural well heads 64 and 64'. In such cases it may be common to fracture plural wells in the same operation, and hence the demand for proppant on site 82 may be higher than if one well were be fractured.

Referring to FIG. 4, a second embodiment of system 10 is illustrated with the bucket elevator 12 mounted adjacent an external side 68C of the tower 68. The telescopic conveyor boom 26 may be mounted at a top 68B of the tower 68, for example on platform 32. The bucket elevator 12 may be a unit that is separated from the tower 68, for example a trailer mounted or trailer deployed unit, which is transported adjacent tower 68, and rigged up to a vertical position and connected to the tower 68 as shown. Other configurations may be used.

Positional words such as up, down, base, top, left, right, vertical, horizontal, and others, are intended to be relative at not defined with respect to the direction of gravitational acceleration on the earth unless context dictates otherwise. The system 10 is expected to be less expensive than the combination of a placing conveyor and an inline feed conveyor, and more flexible than same, all other things being equal. A bucket conveyor 12 may also transport bulk material faster than a comparable inclined conveyor.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A proppant conveyor system comprising:
   a tower located on or adjacent an oil or gas well site;
   a bucket elevator comprising a vertical elevator belt, rope, or chain assembly positioned within an interior of a housing of the bucket elevator, with a series of proppant scooping devices connected to the vertical elevator belt, rope, or chain assembly;
   a telescopic conveyor boom mounted to the tower above a ground surface;
   the telescopic conveyor boom being connected to convey proppant from an outlet of the bucket elevator to a discharge point defined by the telescopic conveyor boom;
   the telescopic conveyor boom being mounted to swing in lateral directions relative to an axis of the tower to reposition the discharge point; and
   the tower having a ballast weight system at a base of the tower, the ballast weight system comprising a plurality of weights that extend the lateral reach of the telescopic conveyor boom.

2. The proppant conveyor system of claim 1 further comprising a group of storage bins spaced a remote lateral distance from the tower within a maximum range of the telescopic conveyor boom, the group of storage bins being located on the oil or gas well site as part of equipment for carrying out a fracturing operation.

3. The proppant conveyor system of claim 2 in which the tower is located closer to an entrance to the well site than is the group of storage bins.

4. The proppant conveyor system of claim 3 in which the tower is located outside of the well site.

5. The proppant conveyor system of claim 2 in which each storage bin of the group of storage bins is configured as a trailer that has a horizontal transport position and a vertical deployed position.

6. The proppant conveyor system of claim 1 in which the tower comprises plural ground-engaging feet.

7. The proppant conveyor system of claim 1 in which the discharge point is defined at a free end of the telescopic conveyor boom.

8. The proppant conveyor system of claim 7 in which a discharge chute depends from the telescopic conveyor boom to define the discharge point.

9. The proppant conveyor system of claim 8 in which the telescopic conveyor boom is mounted to swing about a lateral axis relative to the tower to raise and lower the free end.

10. The proppant conveyor system of claim 1 in which:
the tower is formed of a lattice frame of columns and cross members; and
the bucket elevator is integrally formed within the tower and is located within the lattice frame.

11. The proppant conveyor system of claim 1 in which the bucket elevator is mounted adjacent a side of the tower.

12. The proppant conveyor system of claim 1 further comprising a feed conveyor mounted to convey proppant to an inlet of the bucket elevator.

13. The proppant conveyor system of claim 1 in which the telescopic conveyor boom comprises plural sections, which are mounted to telescope relative to one another other, with each of the plural sections mounting a respective cooperating conveyor belt.

14. The proppant conveyor system of claim 1 in which the telescopic conveyor boom has an axial length of one hundred feet or more.

15. The proppant conveyor system of claim 1 configured to convey eight tonnes or more of proppant a minute.

16. The proppant conveyor system of claim 1 located at a multi-well pad.

17. The proppant conveyor system of claim 1 in which the tower is formed of a lattice frame of columns and cross members, the lattice frame being formed of a plurality of vertical sections, and in which the lattice frame is height adjustable by addition or subtraction of vertical sections.

18. The proppant conveyor system of claim 1 in which the telescopic conveyor boom comprises plural sections, which are mounted to telescope relative to one another, with each of the plural sections being covered.

19. A method comprising:
conveying proppant up a bucket elevator, along a telescopic conveyor boom mounted on a tower above a ground surface, and into an inlet of a first storage bin at an oil or gas well site, with the tower located on or adjacent the oil or gas well site, the bucket elevator comprising a vertical elevator belt, rope, or chain assembly positioned within an interior of a housing of the bucket elevator, with a series of proppant scooping devices connected to the vertical elevator belt, rope, or chain assembly;
repositioning the telescoping conveyor boom over an inlet of a second storage bin at the well site by swinging the telescopic conveyor boom in a lateral direction relative to an axis of the tower;
conveying proppant up the bucket elevator, along the telescopic conveyor boom, and into an inlet of the second storage bin; and
the tower having a ballast weight system at a base of the tower, the ballast weight system comprising a plurality of weights that extend the lateral reach of the telescopic conveyor boom to the first storage bin and the second storage bin.

20. The method of claim 19 in which the telescopic conveyor boom extends from outside to inside the oil or gas well site.

21. The method of claim 19 in which repositioning comprises swinging the telescopic conveyor boom about a lateral axis relative to the tower to raise and lower a free end of the telescopic conveyor boom.

22. The method of claim 19 in which repositioning comprises extending or retracting plural sections of the telescopic conveyor boom.

23. The method of claim 19 in which conveying further comprises conveying proppant along a feed conveyor to an inlet of the bucket elevator.

24. The method of claim 19 further comprising, prior to conveying proppant into the inlet of the first storage bin, positioning the telescopic conveyor boom over the inlet of the first storage bin.

25. The method of claim 19 further comprising an initial stage of assembling the tower at the oil or gas well site.

26. A proppant conveyor system comprising:
a tower;
a bucket elevator;
a telescopic conveyor boom mounted to the tower above a ground surface;
the telescopic conveyor boom being connected to convey proppant from an outlet of the bucket elevator to a discharge point defined by the telescopic conveyor boom;
the telescopic conveyor boom being mounted to swing in lateral directions relative to an axis of the tower to reposition the discharge point;
in which the discharge point is defined at a free end of the telescopic conveyor boom;
in which a discharge chute depends from the telescopic conveyor boom to define the discharge point; and
in which the telescopic conveyor boom is mounted to swing about a lateral axis relative to the tower to raise and lower the free end.

27. The proppant conveyor system of claim 26 further comprising foundation anchors connected to found the tower.

28. The proppant conveyor system of claim 26 further comprising one or more of extendable outriggers, a base plate, or concrete blocks, connected to found the tower.

* * * * *